Aug. 28, 1934.    F. E. SCOVILLE    1,971,387
ELECTRICAL HEATING DEVICE
Filed March 17, 1931    2 Sheets-Sheet 1
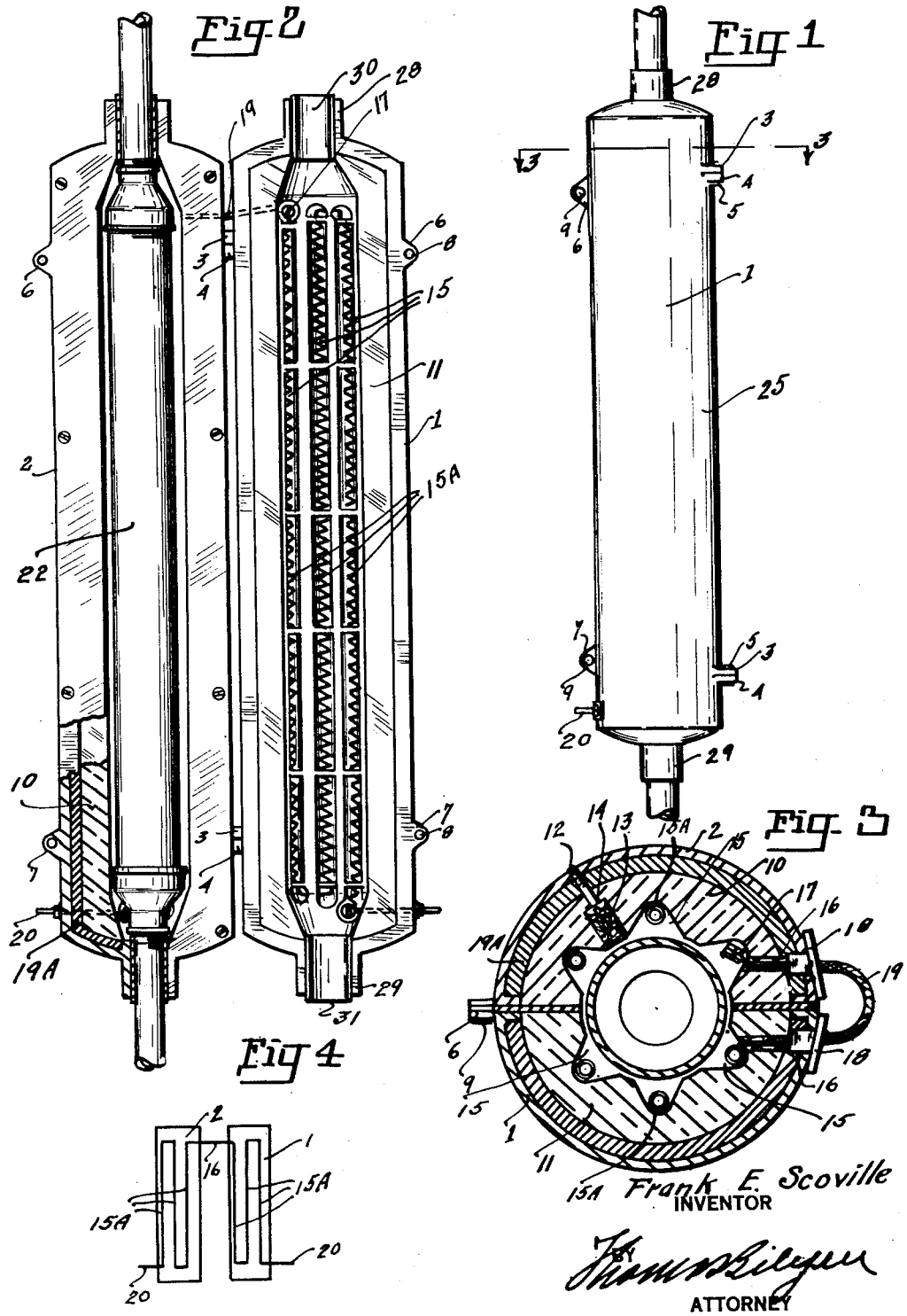

Aug. 28, 1934.  F. E. SCOVILLE  1,971,387
ELECTRICAL HEATING DEVICE
Filed March 17, 1931  2 Sheets-Sheet 2
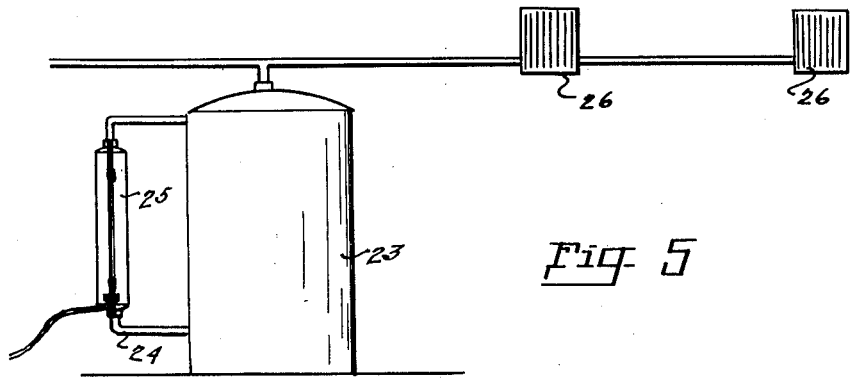
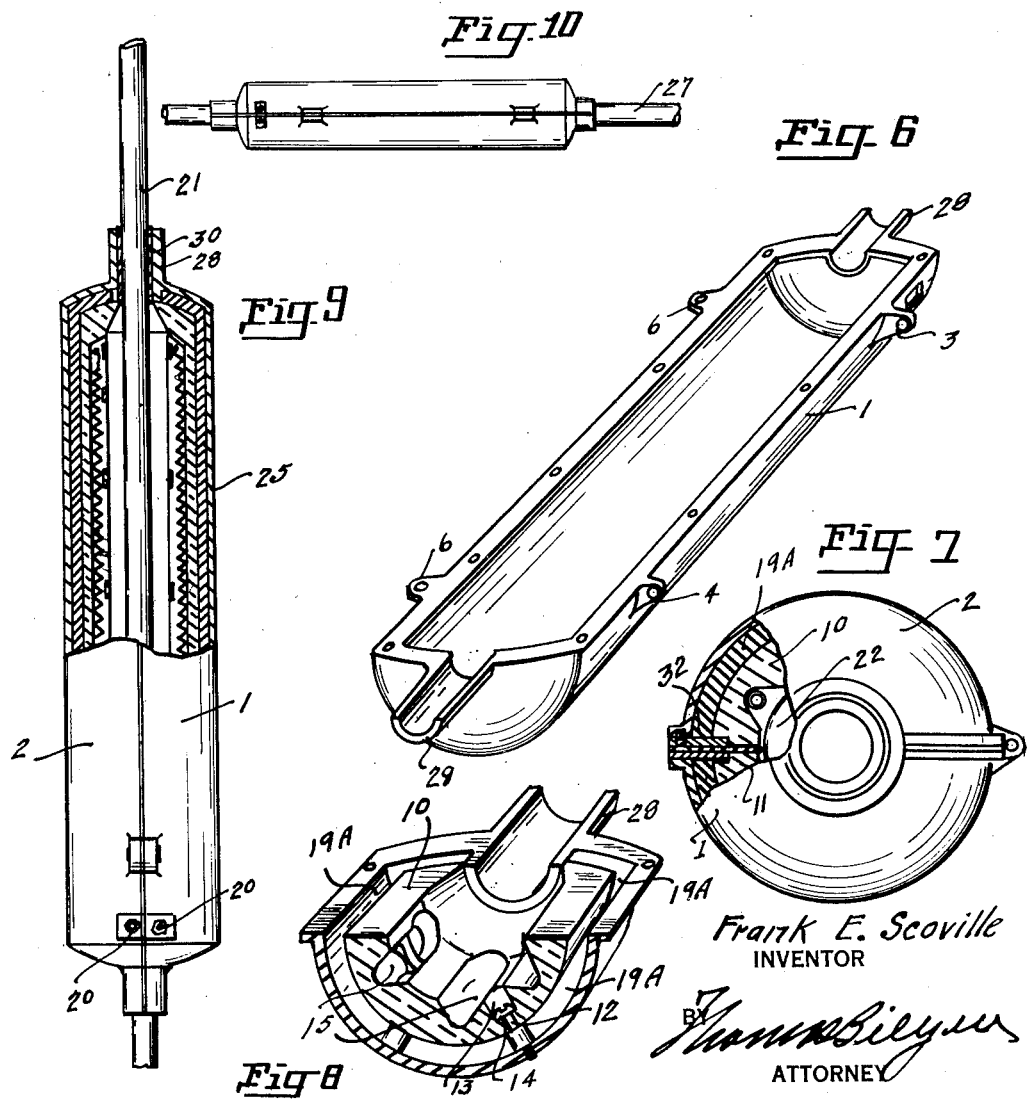
Frank E. Scoville
INVENTOR
ATTORNEY Patented Aug. 28, 1934

1,971,387

UNITED STATES PATENT OFFICE 1,971,387

ELECTRICAL HEATING DEVICE

Frank E. Scoville, Portland, Oreg.

Application March 17, 1931, Serial No. 523,299

4 Claims. (Cl. 219—38)

My new and improved heating device is primarily intended for the heating of fluids passing through a closed conduit. The device may be used as a heater for the thawing of frozen pipes or for increasing the fluidity of the material passing through the pipe.

The device is adapted for being placed about a conduit that is secured at its oppositely disposed ends, to fixed supports. The device in its preferred embodiment consists of two jacket members, hingedly secured together and having lugs outwardly extending from one edge, to facilitate the supporting, clamping or fixedly placing the device upon the conduit. Insulating supports, as porcelain supports are disposed within the jacket members to which the electric heating elements are attached and supported. Insulation is placed between the porcelain members and the jacket, to prevent the abnormal leakage of heat therefrom.

One of the objects of my invention is to provide a simply constructed device adapted for placement upon a closed conduit, for the heating of the materials passing therethrough.

A further object of my invention consists in providing a hinged heating element. Each hinged portion having electric heating elements placed therein that will lie in close proximity to the conduit, upon which the same is to be placed for heating, warming, or increasing the fluidity of materials passing through, or being disposed within the closed conduit.

A still further object of my invention consists in so constructing the heating element, that the same will be comprised of few parts, will be simply constructed and will be ideally adapted for the purposes intended.

A still further object of my invention consists in so constructing the device, that the exposed electric conductor will be insulated from the jacket members.

Still further objects of my invention consist in so constructing the device that the abnormal leakage of the heat therefrom will be prevented.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a side, view of one of my new and improved devices, illustrated in place and position upon a conduit.

Fig. 2 is a side, view of one of my new and improved devices shown in position for being placed upon, or removed from, the closed conduit.

Fig. 3 is a sectional, end, view of the device in place and position upon a closed conduit, the same being taken on line 3—3 of Fig. 1, looking in the direction indicated.

Fig. 4 is a fragmentary, diagrammatical lay out of the electric heating element.

Fig. 5 is a side, view of a liquid container, illustrating piping leading thereinto and therefrom, and illustrating one of my new and improved devices in place upon the piping.

Fig. 6 is a perspective, end view of one of the jacket members.

Fig. 7 is a fragmentary, sectional, end view of the assembled device.

Fig. 8 is a fragmentary, perspective, end view of one jacket member and illustrating the porcelain support for the electric element disposed therein and also illustrating the insulation that is disposed between the jacket and porcelain.

Fig. 9 is a fragmentary, sectional, side view of the assembled device, illustrated in position upon an enlargement disposed therein, to increase the heated surface of the same.

Fig. 10 is a side, view of one of my new and improved devices in place upon a horizontally disposed pipe. In this position, the same may be used for thawing, or for any other purpose.

Like reference characters refer to like parts throughout the several views.

I preferably form my device of two like half, section jacket members 1 and 2.

Pairs of lugs 3 and 4 outwardly extend from the jackets, the lugs, being in registerable alignment with each other to form hinging supports through which a suitable hinge pin 5 passes. The purpose is to split the jacket into halves, to facilitate its placement about a pipe, or conduit.

Pairs of lugs 6 and 7, outwardly extend from the oppositely disposed sides of each of the jackets and the lugs are in registerable alignment with each other. Each of the lugs has a hole 8 disposed therethrough and the holes of each pair of lugs are in registerable alignment, to facilitate the placement of a fastening, as a bolt or screw 9 therethrough, to secure the jacket members together and to support the jackets upon any suitable conduit, that is to be warmed, or heated, or thawed.

Split electric insulating supports, as porcelain members 10 and 11 are disposed within the jackets of the porcelain members and they are secured to the jacket members by any suitable means as by screws 12.

Recesses 13 being disposed within the porcelain members through which the screw may be countersunk, to place the head 14 of the screw in spaced relationship with the electric conductors.

Slots 15 are disposed longitudinally of the inner surface of each of the porcelain members into which coils of electric conductor resistance wire may be placed for heating the conduit about which my heater is to be placed.

I preferably make the heater for each half section of a single piece of resistance wire and connect the same across to the next half section by an independent electric conductor 16, the conductor 16 being secured to the resistance wire 15A, by any suitable fastening connection, as by a threaded screw connection 17.

An insulating plug 18 passes through each of the jacket members through which the electric conductor 16 passes, the same being jacketed on its outside, preferably by a piece of metal loom 19.

The porcelain members 10 and 11 are in spaced relationship with their respective jacket members and the interstices 19A disposed between the porcelains and the jacket is filled with a heat insulating material, to prevent the abnormal escapement of heat from the heating device.

The electric terminals have suitable plug connection 20 disposed upon the outside of the jacket and are so placed that an electric socket may be detachably secured thereto, the same is illustrated in Fig. 9.

Where a relatively large amount of heat is to be imparted to the fluid to be heated, the conductor 21, as illustrated in Fig. 9, may have an enlargement 22 placed therein, and about which my heater is placed, the enlarged position of the fluid conduit gives an added surface to be heated and increases the heating capacity of the device.

I have shown in Fig. 5, one of my new and improved devices, as being used in conjunction with a tank 23, that has a piping connection 24, that leads away from and into the tank 23. The heater 25 being placed upon the pipe 24, the circulation of the heated fluid through the pipe is accomplished through thermal action. The heated fluid may be used for any purpose, as for the heating of radiator coils 26.

My device may be used as a thawing device, as by placing the same upon a pipe 27, as illustrated in Fig. 10, that has been frozen at a particular location, the device being removably placed thereupon, for heating the pipe at the point that the freeze occurred.

Collars 28 and 29 are disposed upon the oppositely disposed ends of each of the body elements, adapted for the passing of the pipe 27, longitudinally of the body element. Heat insulating devices 30 and 31 being disposed between the collars 28 and 29 and the pipe, to prevent the abnormal flow of heat from the pipe into the body elements. A gasket 32 is disposed upon the faces of each of the body elements for forming a relatively tight working connection between the two body elements, when hinged together upon a pipe.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:—

1. A heating device for water pipes, comprising a cylindrical metallic jacket, a layer of heat insulating material concentrically disposed within the jacket, an inwardly disposed concentric shell of material having the properties of an electrical insulator and heat reflector, grooves disposed upon the inner surface of the insulating shell and extending longitudinally thereof; said grooves being semi-cylindrical on their outward limits and V-shaped on the inward limits, a central space adapted to receive a cylindrical pipe or other container, electrical heating elements disposed within the grooves, means disposed upon the external jacket to connect the electrical heating elements to any external source of electric energy.

2. A device of the class described, comprising a pair of semi-cylindrical jackets, members hingedly secured together upon one side and adapted for being fixedly secured upon the oppositely disposed side, a layer of heat insulating material concentrically disposed within the jacket, an inwardly disposed, concentric shell of material having the properties of an electric insulator and heat reflector, V-shaped grooves extending longitudinally disposed upon the inner surface of the insulating shell with the vertex extending outwardly, the vertex of the angle being modified to a semi-cylinder, electrical heating elements disposed within the grooves, means disposed upon the external jacket to connect the electrical heating elements to an external source of electric energy.

3. A device of the class described, comprising a pair of semi-cylindrical jacket members hingedly secured together upon one side and adapted for being fixedly secured upon the oppositely disposed side, a layer of heat insulating material concentrically disposed within the jacket, an inwardly disposed concentric shell of material having the properties of an electric insulator and heat reflector, V-shaped grooves extending longitudinally disposed upon the inner surface of the insulating shell with the vertex extending outwardly, the vertex of the angle being modified to a semi-cylinder, electrical heating elements disposed within the grooves, means disposed upon the external jacket to connect the electrical heating elements to an external source of electric energy, a central core space adapted to receive a pipe or cylindrical container, an enlargement of the core space extending longitudinally for a substantial portion of the length of the device and diametrically sufficiently to receive a pipe or cylindrical container of greater diameter than that which may be accommodated at the ends of the device.

4. A device of the class described, comprising a pair of semi-cylindrical jacket members hingedly secured together upon one side and adapted for being fixedly secured upon the oppositely disposed side, a layer of heat insulating material concentrically disposed within the jacket, an inwardly disposed concentric shell of material having the properties of an electric insulator and heat reflector, V-shaped grooves extending longitudinally disposed upon the inner surface of the insulating shell with the vertex extending outwardly, the vertex of the angle being modified to a semi-cylinder, electrical heating elements disposed within the grooves, and said grooves shaped to reflect heat falling upon them toward the center of the device.

FRANK E. SCOVILLE.